United States Patent [19]

Bardet

[11] 4,163,140
[45] Jul. 31, 1979

[54] PLANT AND A PROCESS FOR SINTERING CERAMIC PRODUCTS

[75] Inventor: Gerard Bardet, Paris, France

[73] Assignees: Automatisme & Technique, Arcueil; Desnarquest et C., Montrouge, both of France

[21] Appl. No.: 717,259

[22] Filed: Aug. 24, 1976

[30] Foreign Application Priority Data

Aug. 26, 1975 [FR] France .................. 75 26286

[51] Int. Cl.² .............................. H05B 9/06
[52] U.S. Cl. .................. 219/10.55 B; 204/157.1 R; 204/159.14; 219/10.55 F; 219/10.55 M; 264/25
[58] Field of Search .............. 219/10.55 A, 10.55 B, 219/10.55 E, 10.55 F, 10.55 M; 236/69, DIG. 15, 15 BB, 15 BR; 264/25, 30, 56; 106/39.5; 204/157.1 R, 157.1 H, 159.13, 159.14

[56] References Cited

U.S. PATENT DOCUMENTS

| 2,404,147 | 7/1946 | Strickland, Jr. ............. 236/DIG. 15 |
| 2,790,054 | 4/1957 | Haagensen .................... 219/10.55 F |
| 2,924,695 | 2/1960 | Atkeson ................... 219/354 |
| 3,662,140 | 5/1972 | Jones et al. .................... 219/10.55 B |
| 3,875,361 | 4/1975 | Fukui ........................... 219/10.55 B |
| 3,974,696 | 8/1976 | Fitzmayer .................... 219/10.55 E |
| 3,999,027 | 12/1976 | Moore ........................... 219/10.55 B |
| 4,009,359 | 2/1977 | Tallmadge et al. .......... 219/10.55 M |
| 4,057,702 | 11/1977 | Lacombe-Allard .......... 219/10.55 M |

FOREIGN PATENT DOCUMENTS

| 1440937 | 3/1963 | Fed. Rep. of Germany ........ 219/10.55 |
| 4532474 | 12/1966 | Japan ................................. 219/10.55 F |
| 4730657 | 12/1966 | Japan ................................. 219/10.55 F |
| 4738777 | 12/1966 | Japan ................................. 219/10.55 F |

Primary Examiner—C. L. Albritton
Assistant Examiner—Bernard Roskoski
Attorney, Agent, or Firm—Brown, Murray, Flick & Peckham

[57] ABSTRACT

The invention relates to a plant for sintering or melting ceramic or refractory products in a wave-guide or a sounding cavity wherein they are subjected to the action of a microwave field, a plant wherein the temperature of the product to be processed is detected and the resulting signal compared with a reference value, so as to generate a differential signal or signal of error, and a driving electronic device to act, depending on said signal of error, on the value of the hyperfrequential power injected in the wave-guide or sounding cavity, in order to have the value of the signal of error reduced to zero.

4 Claims, 3 Drawing Figures

PLANT AND A PROCESS FOR SINTERING CERAMIC PRODUCTS

The invention relates to a process and plants for sintering ceramic or refractory products and submitting said products to be sintered, which are previously preheated at a determined temperature, to the action of an aternative electromagnetic field, in particular a microwave field, so as to bring them to a sintering temperature.

The word "sintering" must be understood very broadly. The sintering operation properly speaking consists in raising the temperature of a compact powdered material until the granules of the powdered material reach a superficial melting and thus weld together in order to substitute the compacted mass having a weak cohesion for a mass showing a strong cohesion and good mechanical properties. When it is applied to ceramic products, and in particular to ceramic products based on alumina or any other refractory oxides, such a sintering operation makes it possible to obtain pieces showing a strong mechanical resistance. However, obviously all the arrangements known can be used such as they are, to obtain any possible stages in sintering operations, from the single sticking of the granules of the material together through small superficial melting beginnings to a total melting of said granules and the obtention of a mass fully melted. Also, obviously the arrangements known can without any modification make it possible to bring the material up to any temperature lower than the sintering one.

The purpose of the present invention is to bring new improvements to known plants, in particular as regards the coefficient of utilization of the microwave power and the regulation of said power.

To this end, the invention relates to a plant consisting of a means for detecting the temperature of the product to be processed, a means for comparing the value of the signal received from said detecting means with a registered value, so as to generate a differential signal or signal of error, and a means for acting, depending on said signal of error, on the value of the microwave power injected in the wave-guide or the sounding cavity, so as to have the value of the signal of error tended to zero.

In one embodiment of the invention, the means for acting on the microwave power injected into the wave-guide or the sounding cavity is a driving electronic means adjusting the current feeding the microwave generator through thyristors.

According to a further embodiment of the invention, the means acting on the microwave power injected into the wave-guide or the sounding cavity, is a driving electronic device adjusting the magnetic field of a non-reversible element carrying an adjustable magnetic field which regulates the microwave power feeding the sounding cavity.

Advantageously, the means for detecting the temperature of the product is a radiation pyrometer.

In order to subdue the interference phenomena, the plant comprises a coupling ring on the wave-guide or the sounding cavity, a detector with crystal connected to said ring, a amplifying circuit of the signal issued by said detector, a contactor with a threshold coupling means connected with the shunting circuit, and a driving electronic device carrying a temporized circuit RC, to interrupt the injection of microwave power inside the wave-guide or the cavity when the value of the amplified signal is over the threshold determined and to restore it after the time determined by the RC circuit elapses, when the shunted signal has dropped back below the value of the threshold.

Temporized RC circuits are standard and should not require a detailed description herein. The purpose of such a circuit in this plant is to delay by a predetermined period of time the resetting of the hyperfrequential power injected into the cavity.

The invention will be explained in detail by means of various non-limitative examples of modes of embodiment shown in the drawings attached hereto wherein.

Figure 1:
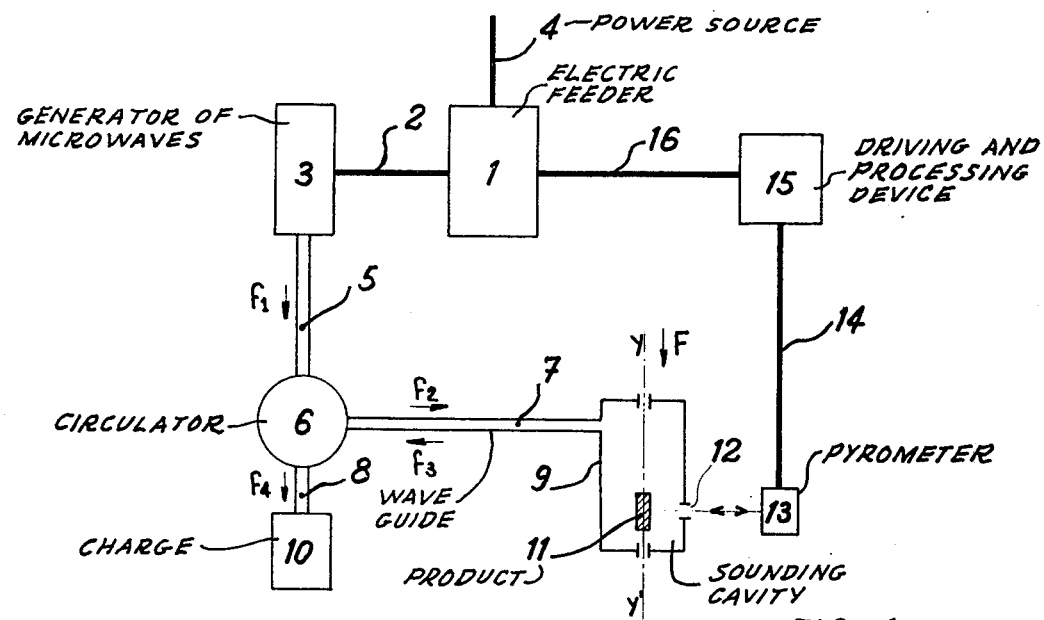
FIG. 1 is a diagrammatical view of a plant according to the invention, wherein the temperature of the product to be processed is adjusted through the control of the power provided by the generator of microwave.

In FIG. 1, the reference 1 designates the whole of the electric and electronic fittings provided to feed, through a connection 2, a generator 3 of microwaves such as a magnetron or a klystron, from a power source 4 not shown with more detail.

A circulator 6, itself connected by two wave-guides 7 and 8 with the sounding cavity 9 and a charge 10, respectively, is connected with the generator 3 of microwaves. The purpose of the circulator 6 is to return, towards the charge 10, through the wave-guide 8, the power reflected by the sounding cavity 9 towards the circulator 6 through the wave-guide 7. Thus, the circulator 6 protects the generator of microwaves 3 against the impact of a great power reflected by the cavity, for example in case the latter would be out of adjustment. So as to obtain such a result, the circulator 6 is definitely adjusted so that the microwave power be canalized according to arrows in succession f1, f2, f3 and f4.

The sounding cavity 9 is arranged so as to concentrate the electric field on the products to be processed 11, which for example move along the axis YY' of the sounding cavity in the direction of arrow F. Besides the two apertures provided along the axis of the cavity so as to allow traveling of the products to be processed, and the aperture connecting the wave-guide 7 with the interior of the cavity, a fourth aperture 12 is provided in the wall of the cavity. Said aperture 12 makes it possible to detect on a pyrometer 13 the radiation delivered by the product to be processed 11. Preferably, the pyrometer 13 will be sensitive to infra-red radiations in a band with a narrow frequency. The output of the pyrometer, possibly corrected in view of the variation of the emitting power of the product to be processed, results in an electric signal, for example a continuous power level, which is brought through a connection 14 to a driving and processing electronic device 15. Said device compares the value of the signal received from the pyrometer 13 with a value of reference, the difference thus obtained constituting a signal of error. Depending on the sign and the amplitude of said signal of error, the electronic device 15 will operate, through a connection 16, feeding device 1 of the generator of microwaves so as to release, in the direction sought, a suitable variation in the amplitude of the microwave power thus generated. By way of example, should the generator of microwaves be a magnetron fed through impulses, the device 15 can act so as to get impulses changed in relation to the period thereof. Should, according to a further example, the generator of microwaves be a magnetron stimulated continuously, the device 15 will regulate the feeding current of the magnetron through the thyristors. These means of regulation of the microwave power, being known in themselves, do not belong to the present invention and, then, will not be described with more detail.

The chain of regulation described hereabove is essentially different from those already known in that the temperature of the products is detected according to it by means of a pyrometer with radiations, while according to the known devices the dielectric characteristics of the products to be processed, which themselves depend on the temperature, are measured by means of a microwave field.

Regulation of the temperature of the products to be processed through adjustment of the power delivered by the generator of microwaves has the great advantage, and exceptional as regards thermic regulation, to intervene within an extremely short period of response. This is the result, on the one hand, of the exclusively electronic nature of the devices used to detect the temperature, processing of the signals and driving of the generator of microwaves and, on the other, of the way of generating heat inside the very body of the product to be processed, through a molecular stirring whose amplitude variations instantaneously follow the variations of the microwave power generated.

On the contrary, in all standard processes of heating through radiation, the variations of the heat absorbed by the product to be processed are broadly offset in time in relation to the variations of the power supplied to the processing furnace, in view of the thermic inertia of the radiant elements, particularly the walls of the furnace.

A further advantage of the type of regulation just described, through adjustment of the power delivered by the generator of microwaves, is that the power taken at the corresponding current supplied from the mains, in view of the energetic outputs of the generator of microwaves and of the feeding circuits thereof, corresponds to the minimum required, which is of a real economical interest when high-power plants are involved.

On the other hand, when smaller plants will be involved, it will often be of interest to operate the generator of microwaves at a constant power, close to its maximal power, and to regulate the temperature of the product to be processed by varying the fraction of said constant power injected inside the wave-guide or the sound cavity. The devices required to vary said useful fraction of the hyperfrequential power being simpler and cheaper than those required to act upon feeding of the microwave generator, a simpler and cheaper plant is thus achieved, a most important power having to be taken from the mains as a counterpart.

Figure 2:
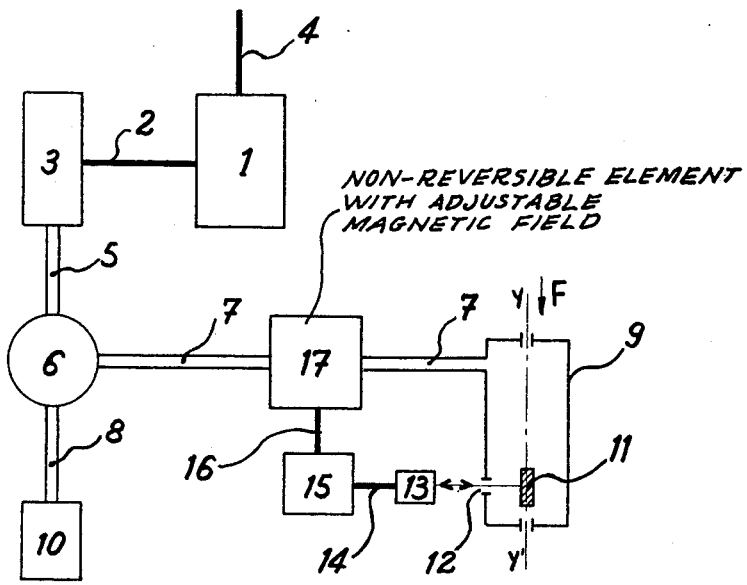
FIG. 2 is a diagrammatical view of a plant according to the invention wherein the temperature of the product to be processed is adjusted through the control of the power injected into the cavity, thanks to the action of a device positioned between the generator of microwaves and said cavity.

FIG. 2 shows a plant wherein the temperature of the product to be processed is regulated through this second process. The plant shown in FIG. 2 consists of all the components constituting the plant shown in FIG. 1, which bear the same references therein. Furthermore, it carries a "non-reversible element with an adjustable magnetic field" 17, inserted on the wave-guide 7 between the circulator 6 and the sounding cavity 9. Said non-reversible element with an adjustable field can be of various types. For example, it can consist of a reducer or a circulator, etc. . . . Depending on the adjustment of its magnetic field, it will allow a more or less great fraction of the microwave power to pass towards the sounding cavity 9. Adjustment of the megnetic field of the element 17 will be ensured, through the connection 16, by the driving and processing device 15 which will control said adjustment depending on the signal of error which it will have elaborated by comparing with a value of reference the value transmitted by the pyrometer 13. Of course, and as it is the case in the plant shown in FIG. 1, the pyrometer 13 could be substituted there for a device using a microwave field of measure.

As in the case of the chain of regulation shown in FIG. 1, the time of response of the regulation shown in FIG. 2 is extremely short.

The experience shows that when the temperature of the products heated through a microwave field reaches a high level, over 1500° C. for example, phenomena of interference occur which especially result in release of charges (electrons or ions sometimes). Said charges are canalized within the electric field and a conducting charge of space may appear, which causes falling of the over-voltage of the cavity and, thereby, falling of the thermic effect generated inside the product to be processed, which quickly gets cold. Of course, it is required to subdue intervening of this phenomenon when it is sought to process products at a high temperature.

Figure 3:
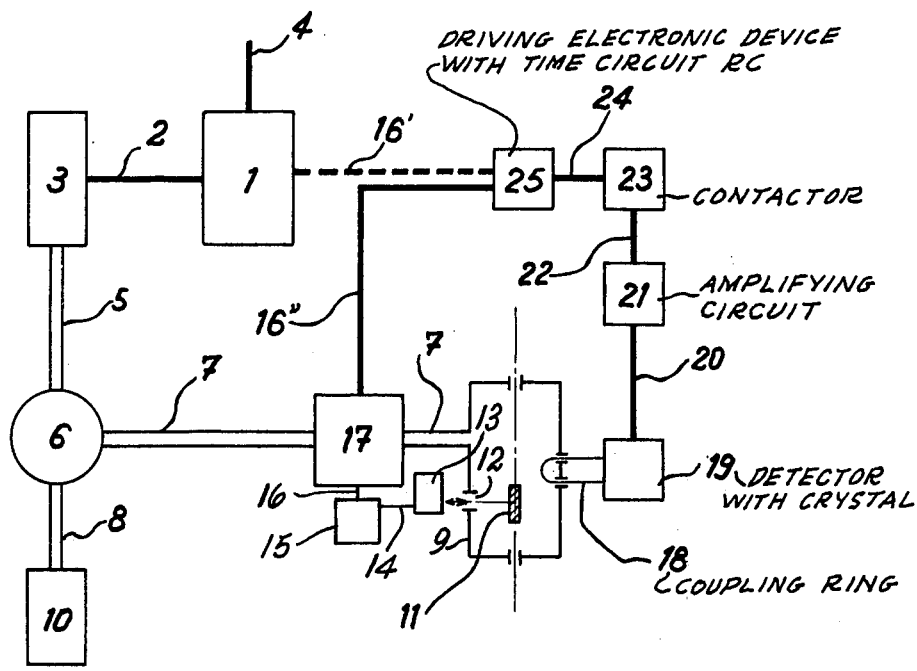
FIG. 3 is a diagrammatical view of a plant according to the invention, wherein intervening of interference phenomena, such as charge deliveries, is stopped through the temporary interruption of the power injection in the sounding cavity.

FIG. 3 shows a plant which can involve all the elements constituting the plant described by making reference to FIG. 1, or those of the plant described by making reference to FIG. 2, those of said elements shown in FIG. 3 bearing the same references as in FIGS. 1 and 2. Thus, the constituting elements 1 to 10 and 17, are still shown in FIG. 3 while, by way of simplification, the specific constituting elements of the regulation of the temperature, namely: 12 to 16 of FIGS. 1 and 2, have not been shown again in said FIG. 3.

On the other hand, FIG. 3 shows the following constituting elements not shown in FIGS. 1 or 2:

a coupling ring 18, fitted onto the sounding cavity 9;

a detector with crystal 19 connected with the ring 18 and whose outlet ends to a amplifying circuit 21;

a contactor with a threshold value 23, whose inlet 22 is connected with the amplifying circuit 21 and the outlet thereof with a driving electronic device 25 carrying a time-circuit RC.

The whole of said constituting elements works as follows:

When the over-voltage of the cavity is normal, a certain power is transmitted to the coupling ring 18, and the detector with crystal 19 changes said power into a proportional voltage. Should a conducting space charge appear inside the cavity, the cavity over-voltage falls down, generating the fall of the power transmitted to the coupling ring 18 and then that of the outlet voltage of the detector 19. Said fall in the voltage is changed by the amplifying circuit 21 into a signal having a strong amplitude which releases the contactor with a threshold value 23 which then sets up the communication with the driving electronic device 25. Applying the signal coming from the circuit 21 at the inlet 24 of the device 25 results in two consequences, namely:

the instantaneous total interruption of the microwave power feeding of the cavity 9;

the charge of the circuit RC of the electronic device 25.

The instantaneous interruption of the microwave power feeding of the cavity 9 is performed, either through a direct action of the hyperfrequential generator feeding 1 (through the connection 16' shown with dash lines), or through an action on a nonreversible element 17 (through the connection 16" shown with full lines), the first alternative preferably applying to a plant as shown in FIG. 1, and the second to a plant such as shown in FIG. 2.

The interruption of the power thus achieved instantaneously interrupts charge emissions inside the cavity. Furthermore, it instantaneoulsy originates a null value, then a constant one, the power transmitted to the ring 18, then also the inlet signal in the shunting circuit 21 which, consequently, transmits a null outlet signal, causing opening of the contactor 23 with a threshold value. Then, the circuit RC of the device 25 discharges. When said discharge is over, the microwave power injected inside the cavity 9 retakes its former value, that is to say, the value it had just before the conducting space charge appeared.

The threshold value of the contactor 23 can be adjusted as well as those of R and C within the circuit RC being a part of the device 25. Then, it is possible by adjusting the threshold value, on the one hand, to determine the limit of the intensity of the phenomenon of the emission of charges beyond which the process described hereabove does release and, on the other, by adjusting the time-constant of the circuit RC, to determine the interval of time between two interruptions of the microwave power injection inside the cavity. Each interruption must last sufficiently so as to neutralize the phenomenon of formation of a conducting space charge and, however, sufficiently short so that the temperature of the product to be processed does not notably decrease in view of the interruption of the microwave action. Thus, in this process for removing interference phenomena, advantage is taken of the thermic inertia of the product to be processed, in comparison to the very small inertia of the detecting electronic circuits, and of the processing and driving circuits as well.

Of course, the invention is not limited to the modes of embodiment described and depicted hereabove, from which other modes and methods of embodiment can be provided without thereby departing from the scope of the invention.

What we claim is:

1. A plant for sintering or melting ceramic or refractory products, comprising means provided with a cavity for receiving such products, an electric current supply, means for generating microwave power, means for feeding said current to said generating means, means for delivering said power to said cavity to heat a product therein, means for detecting the temperature of a product in said cavity and generating a corresponding electric signal, means for comparing said signal with a reference value and generating a differential electric signal, a driving electronic device responsive to said differential signal, means electrically connecting said device to said electric current feeding means for controlling said electric current feeding means to control the value of the microwave power delivered to said cavity to reduce said signal differential to zero, a coupling ring associated with said cavity, a detector with crystal connected with said ring for generating a voltage signal, an amplifying circuit for said voltage signal connected with said detector, a contactor with a predetermined threshhold value responsive to said amplified signal, and a driving electronic device provided with a time-circuit RC and connected with said contactor to interrupt delivery of said power to said cavity when the value of said amplified signal exceeds said predetermined threshhold, said last-mentioned driving electronic device restoring delivery of power to the cavity when the time determined by the time-circuit RC elapses after the amplified signal has fallen under said threshhold value.

2. A plant according to claim 1, wherein said second driving electronic device controls said current feeding means.

3. A plant according to claim 1, including a nonreversible element provided with an adjustable magnetic field and disposed between said generating means and cavity for controlling the microwave power delivered to the cavity, said second driving electronic device controlling said adjustable magnetic field.

4. A plant for sintering or melting ceramic or refractory products, comprising a cavity for receiving such products, an electric current supply, means for generating microwaves, means for feeding said current to said generating means, means for injecting the microwaves into said cavity to heat a product therein, and means responsive to fall in the over-voltage in the cavity for interrupting said injection of microwaves into said cavity for periods of time short enough to avoid appreciable reduction in temperature of the products within the cavity but close enough together to maintain the intervals of time between successive interruptions shorter than the time required to produce charge emissions in said cavity.

* * * * *